(12) United States Patent
Kitson

(10) Patent No.: US 10,635,544 B1
(45) Date of Patent: Apr. 28, 2020

(54) ASSIGNING VMWARE LOCAL PROXY HOST-DATASTORE GROUPS FOR CONSISTENTLY OPTIMIZED ACCESS

(71) Applicant: EMC CORPORATION, Hopkinton, MA (US)

(72) Inventor: Clinton S. Kitson, Foster City, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 332 days.

(21) Appl. No.: 14/209,587

(22) Filed: Mar. 13, 2014

(51) Int. Cl.
*G06F 11/14* (2006.01)
*G06F 3/06* (2006.01)

(52) U.S. Cl.
CPC ........ *G06F 11/1456* (2013.01); *G06F 3/0604* (2013.01); *G06F 3/065* (2013.01); *G06F 3/0683* (2013.01)

(58) Field of Classification Search
None
See application file for complete search history.

(56) References Cited

U.S. PATENT DOCUMENTS

| | | | | |
|---|---|---|---|---|
| 8,438,349 B2* | 5/2013 | Olson | ................. | G06F 11/1456 711/161 |
| 9,146,747 B2* | 9/2015 | Moloney | ................. | G06F 15/80 |
| 2010/0070725 A1* | 3/2010 | Prahlad | ............... | G06F 11/1453 711/162 |
| 2011/0035546 A1* | 2/2011 | Iyoda | .................... | G06F 3/0605 711/112 |
| 2013/0086593 A1* | 4/2013 | Sloma | ..................... | G06F 9/505 718/105 |
| 2013/0108259 A1* | 5/2013 | Srinivas | ............... | H04Q 3/0083 398/25 |
| 2014/0101100 A1* | 4/2014 | Hu | ...................... | H04L 67/1002 707/617 |
| 2014/0196038 A1* | 7/2014 | Kottomtharayil | ....... | G06F 9/505 718/1 |
| 2015/0081994 A1* | 3/2015 | Christopher | ........ | G06F 11/1458 711/162 |

\* cited by examiner

*Primary Examiner* — Ann J Lo
*Assistant Examiner* — Michelle T Bechtold
(74) *Attorney, Agent, or Firm* — Workman Nydegger (57) ABSTRACT

In one example, a method for generating a host affinity policy includes selecting one or more criterion for a host affinity policy, and scanning a computing environment and establishing a baseline configuration of the computing environment based upon the scan. The selected criteria are then applied to baseline configuration information, and a host affinity policy is generated based upon the application of the selected criteria to the baseline configuration information. In this example, the host affinity policy identifies a cluster that includes set of hosts, a backup proxy, and a set of datastores that are accessible by one or more of the hosts and the backup proxy.

20 Claims, 7 Drawing Sheets

ASSIGNING VMWARE LOCAL PROXY HOST-DATASTORE GROUPS FOR CONSISTENTLY OPTIMIZED ACCESS

Embodiments of the present invention generally relate to the performance of backup and related processes. More particularly, embodiments of the invention relate to systems, hardware, computer-readable media, and methods for performing backups in a computing environment, notwithstanding changes to the configuration of the computing environment.

BACKGROUND

Entities often generate and use data that is important in some way to their operations. This data can include, for example, business data, financial data, and personnel data. If this data were lost or compromised, the entity may realize significant adverse financial and other consequences. Accordingly, many entities have chosen to back up some or all of their data so that in the event of a natural disaster, unauthorized access, or other events, the entity can recover any data that was compromised or lost, and then restore that data to one or more locations, machines, and/or environments. However, the process of backing up data can be problematic in some environments.

The hypothetical example of a cluster that includes multiple hosts. Each host may include one or more virtual machines (VM), and multiple datastores is illustrative. In this example, the hosts may have shared access to each of the datastores. During normal operations, the VMs host storage data path allows access to the datastores, and backup of the VMs may be performed in connection with a separate backup proxy. In order to perform the backup, this backup proxy can have either direct access through its own storage data path or through the host's storage data path.

However, the cluster will typically experience a configuration change at one time or another. For example, a VM host and/or datastore may go offline or otherwise become unavailable to other nodes in the cluster. In the event of such changes, host storage data paths can be affected and normal operations may no longer be effective or available. For example, if a VM has data stored on a particular datastore, but that datastore is offline for a specific host, that VM must be backed up leveraging the storage path of another host, if possible.

However, it may be problematic to back up the VM using the storage data path of another host. For example, there may be one or more datastores in the cluster that are unavailable to the host where the backup proxy resides. As a result, the VM's host may respond to non-availability of a data store by employing a network block device (NBD) transport mode where data is read from the VM and transmitted across a network to a backup server. In many cases however, the network may not have adequate bandwidth to support fast and efficient transport of the data to the backup server. Moreover, backup of the VM using the network may compromise other operations for which the network was primarily intended. These problems are magnified in relatively large networks where predictability of data paths is important to ensure consistent operations and response times.

In some circumstances, the backup proxy may attempt to back up the VM in a non-optimal, or at least less optimal, way after a configuration change has occurred. For example, if a datastore is not available to a VM host through its storage data path, it is possible that a less optimal alternative may be used to back up the VM. In this situation, the backup proxy may gain access to the VM data through the network data path to the VM host. To do so however, the backup proxy may require use of a network transport mode.

As the foregoing examples demonstrate, the method to perform the backup (VM host storage data path or VM host network data path) may be randomly determined. Consequently, the backup of VMs in a cluster may not all interact consistently with a given backup proxy, data store, host, or cluster. This inconsistent behavior can adversely affect backup process, as well as the resultant images.

In light of the foregoing, it would be useful when backing up a VM to minimize, or avoid, the use of cross-host networking, such as by way of a network transport mode, in the event that the VM host and/or datastore accessible to the VM host are unavailable for some reason. Likewise, it would be desirable to associate VM hosts only with those datastores to which they have access so that even if one or more datastores of the cluster become unavailable, the backup proxy still has storage data path access to a datastore that can be utilized without necessitating a network transport mode.

BRIEF DESCRIPTION OF THE DRAWINGS

In order to describe the manner in which at least some aspects of embodiments of the invention can be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Embodiments of the present invention generally relate to the performance of backup and related processes. More particularly, embodiments of the invention relate to systems, hardware, computer-readable media, and methods for performing backups in a computing environment, notwithstanding changes to the configuration of the computing environment.

In at least some embodiments, a plurality of virtual machines (VM) running various applications reside on respective hosts that comprise part of a cluster. In addition to the hosts, the cluster also includes a plurality of datastores. The specific grouping of hosts and datastores, that is, the configuration of the cluster, is defined by a host affinity policy which, in general, groups hosts and datastores together according to which hosts in the computing environment have access to which datastores in a computing environment that includes the cluster. As well, the combination of hosts and datastores that constitutes the cluster also corresponds to a dedicated backup proxy that is configured based on that particular combination. The backup proxy runs a backup application to perform image level backups of the VMs in the grouping.

In terms of the backups to be performed regarding the cluster elements, the backup proxy can use a hot add, or comparable, process to provide data path access of the VMs virtual disks to the backup proxy. The backup proxy processes the data of the virtual disk, such as by performing a de-duplication process and/or other processes, and then backs up the processed data to chosen backup storage. In general, the backup proxy can process one or more virtual disks and VMs with little, or no, use of a network transport mode.

Because, as defined by the host affinity policy, the datastores are commonly accessible to all of the hosts, a change to the configuration of the cluster, such as a datastore or host coming offline, does not impair the ability of the backup proxy to continue to back up all of the VMs. As well, use of a host affinity policy and cluster configuration such as just described can reduce, or eliminate, the problems associated with use of cross-host networking processes when backing up VMs.

As may be evident from the preceding discussion, and other disclosure herein, embodiments of the invention may provide various advantages, although it is not necessary, or required, that any particular embodiment(s) provide any particular advantage(s). Moreover, and consistent with the foregoing, embodiments within the scope of one or more claims may additionally, or alternatively, provide one or more advantages not specifically enumerated herein. Finally, to the extent that possible advantages are enumerated herein, those may be present in one or more embodiments in any combination.

A. Example Operating Environments

In general, embodiments of the invention may include and/or be implemented in a cluster environment that includes a plurality of nodes. The cluster may comprise an element of a larger computing environment that may include one or more additional clusters. Example nodes include hosts such as servers, one or more hosts of a backup proxy, one or more datastores, one or more VM hosts which may serve as clients in some instances, and combinations of the foregoing. The cluster may consist of, form a part of, or comprise, a cloud computing environment, although that is not required. As well, one or more portions of the cluster may comprise elements of a VMware vSphere environment although, again, that is not required. The nodes in the cluster may each operate autonomously, and in connection with different respective datastores, while in other embodiments, a single datastore may serve more than one node. In at least some embodiments, one, some or all of the datastores in the cluster are accessible, directly and/or indirectly by one, some or all of the nodes in that cluster.

One or more applications may reside on one or more of the nodes of the cluster environment, and the applications may generate and/or cause the generation of data that is desired to be backed up and restored. For example, one, some, or all of the nodes in the cluster may host one or more VMs, each of which may be running various applications. In at least some embodiments, the VMs may be created and run by a hypervisor, also sometimes referred to as a virtual machine monitor (VMM), although use of a VMM is not required. One example of such a hypervisor is ESX/ESXi. This is a bare-metal embedded hypervisor offered by VMware for vSphere technologies. The VMM, when present, can take the form of software, firmware, or hardware, or combinations of any of those, and the VMM may be configured and operable to communicate with the backup proxy.

The cluster environment may also include one or more datastores having one or more volumes that are accessible for read and write operations, also sometimes referred to as I/O operations, by one or more of the nodes within the cluster environment. Access to the datastores by the nodes may, or may not, take place by way of a backup proxy. In at least some embodiments, the backup proxy includes a VMware hot-add, or comparable, capability for interfacing with one or more of the VMs. As well, the backup proxy includes a backup application, such as the EMC NetWorker backup and restore application or the EMC Avamar backup and restore application, that processes VM data, such as by de-duplicating the data for example, before backing up the VM data to a datastore.

Backups performed in connection with embodiments of the invention include image level backups. Examples of image level backups include full copies of a system for a backup, typically using a snapshot and API framework of a virtualization infrastructure, along with the entire file system and application inventory of the system backed up. Various processes can be performed in connection with image level backups. By way of example, data de-duplication can be used to reduce the amount of stored data since, absent de-duplication, image-level backup applications may use snapshots and back up all of the data including deleted files and empty disk blocks.

Figure 1:
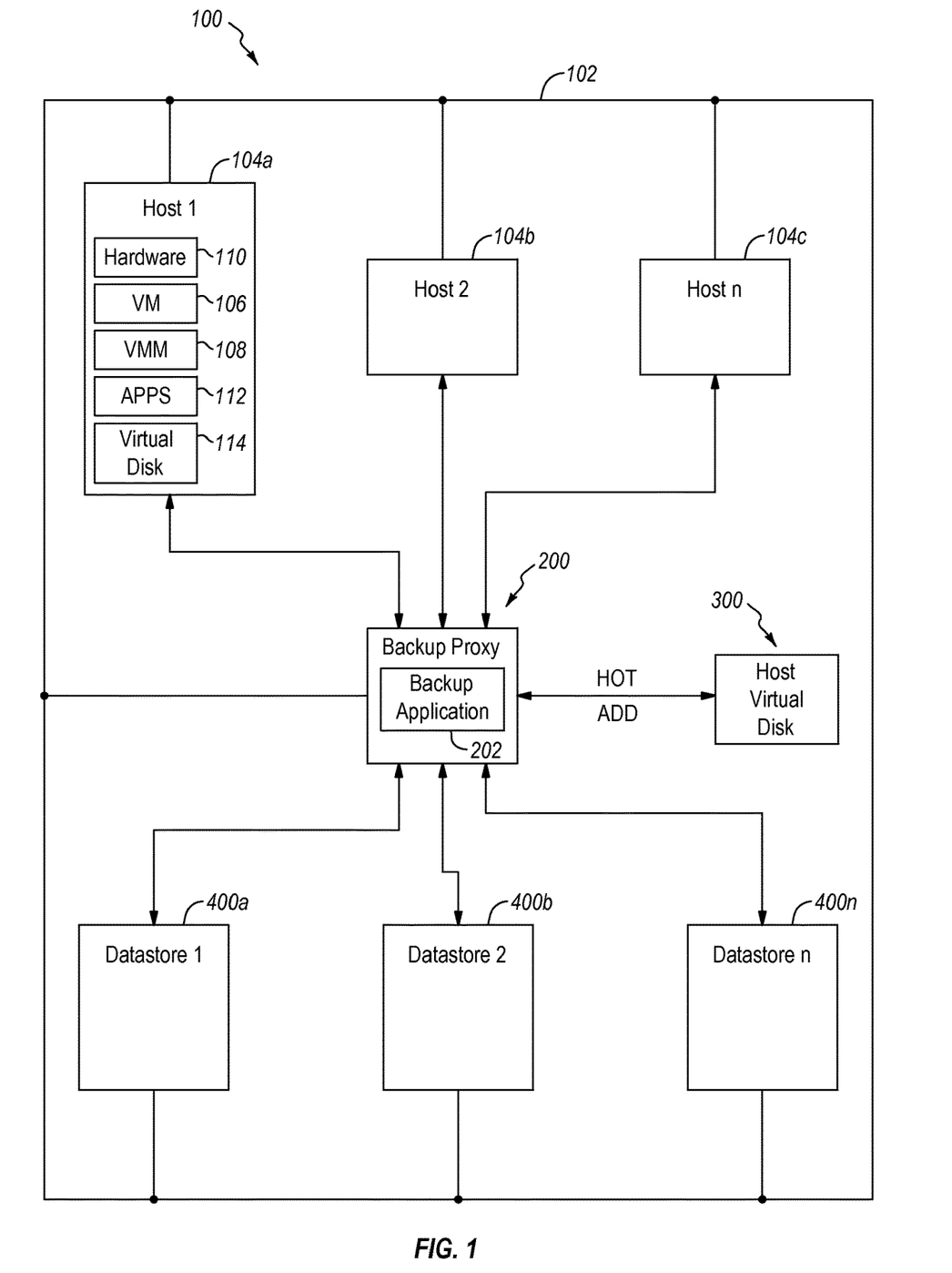
FIG. 1 discloses aspects of one example operating environment for one or more embodiments of the invention.

With the foregoing in mind, attention is directed now to FIG. 1 which discloses aspects of an example operating environment 100, which may take the form of a cluster operating in a network 102, or portion thereof, such as a LAN, WAN or other type of network. The operating environment 100 may be hardwired, wireless, or some combination thereof. In some instances, some or all of the operating environment 100 may comprise an optical communication network.

The operating environment 100 may employ a single type of communication protocol, or can take the form of a converged network that employs multiple different communication protocols. In one example embodiment, the operating environment 100 employs the Fibre Channel (FC) protocol to control communications between two or more nodes of the network 102. However, the scope of the invention is not limited to any particular communication protocol, and any other technology suitable for a storage networking environment may alternatively be employed.

The operating environment 100 may also employ the Ethernet communication protocol. The Ethernet protocol can be used for communications between datastores and the network 102. The use of Ethernet is not required however, and any other technology suitable for datacenter applications can alternatively be employed.

The example operating environment 100 includes a plurality of nodes 104a-104c, each of which may be connected to the network 102, and which are respectively denoted as Host 1, Host 2, and Host 'n.' Two or more of the nodes 104a-104c may be similar to, different from, or identical to, each other in terms of configuration and/or operation. One or more of the nodes 104*a*-104*c* may take the form of a server, such as a VMware ESX server for example. However, it is not necessary that the node take the form of an ESX server, and other types of servers can alternatively be employed.

In the example of FIG. 1, node 104*a* hosts a VM 106, VMM 108, and includes hardware 110 such as disk drives, processors, computer readable media carrying executable instructions for one or more applications, wireless and/or hardwired communication hardware, RAM, ROM, flash memory, I/O devices, data storage elements, or any combination of the foregoing. As well, the VM 106 may run one or more applications 112 that generate and/or cause the generation of data that is required to be backed up. Such data may include, but is not limited to, any one or more of application data, system and other files, operating systems, file directories, and objects. In addition to the aforementioned elements, the node 104*a* may include a virtual disk 114 that locally stores data generated by the VM 106.

Figure 1A:
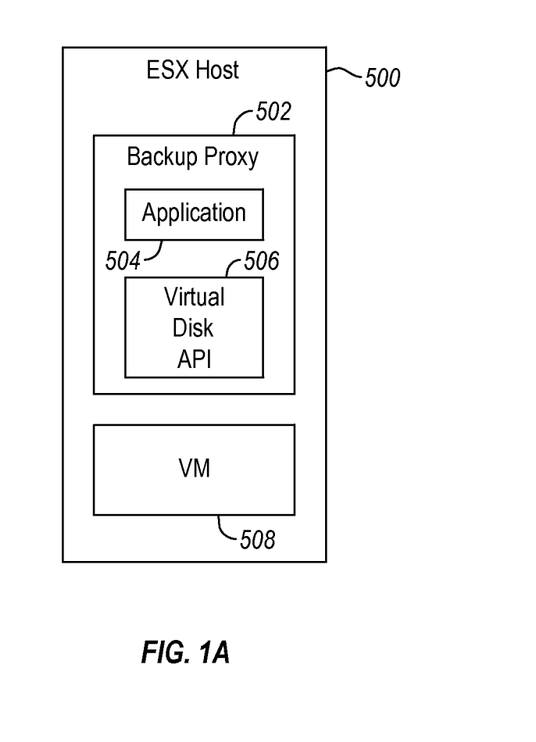
FIG. 1a discloses an example backup proxy configuration.

With continued reference to FIG. 1, the operating environment 100 may include a backup proxy 200 that is configured to communicate with one or more of the nodes 104*a*-104*c*, such as with VM 106 for example. The backup proxy 200 may take the form of a VM that can be hosted on a server, such as a VMware ESX server for example, although other types of servers could alternatively be used to host the backup proxy 200. In the example of FIG. 1*a*, discussed below, the backup proxy 200 is hosted by a dedicated server. However, such an arrangement is not required and, in at least some embodiments, the backup proxy 200, which may comprise the Avamar Image Proxy VM for example, may reside on one of the hosts 104*a* . . . 104*n* of a cluster, or the backup proxy 200 may, itself, comprise a host such as an ESX host for example.

The backup proxy 200 includes a backup application 202 that, in general, operates to back up data from one or more VMs to a datastore. In at least some instances, the backup application 202 also operates to restore data from a datastore to one or more target machines, such as a VM for example. As noted elsewhere herein, the backup application 202 may take the form of the EMC NetWorker application or the EMC Avamar application, although neither is required and other backup applications could alternatively be used.

As further indicated in FIG. 1, and discussed in more detail elsewhere herein, the backup application 202 is operable to perform a process wherein virtual disk data is requested by the backup proxy 200 from a VM, such as VM 106 for example, and that virtual disk data is used to attach a virtual disk 300 to the backup proxy 200. Such a process, when performed while the VM is running, is referred to herein as a hot-add process. In at least some cases, data transfer performed in accordance with the hot-add process occurs only within the VM host storage path, and does not involve use of the network 102. Accordingly, the use of a hot-add in this way may be referred to herein as constituting a hot-add transport mode. Moreover, it will be apparent that use of a hot-add transport mode can eliminate the need to use the network 102 for transporting data in connection with processing a VM for backup.

The backup proxy is operable to communicate with a plurality of datastores 400*a*, 400*b*, and 400*n* that are included in the example operating environment 100. One or more of the datastores 400*a*-400*c* may be configured to communicate with one or more other nodes by way of the network 102, although that is not required. Additionally, or alternatively, one or more of the datastores 400*a*-400*c* are accessible by the backup proxy 200 along a data path that is internal to the VM host storage path and does not include any part of the network 102.

With the foregoing discussion of FIG. 1 in view, attention is directed now to FIG. 1*a* which discloses aspects of a backup proxy host, one example of which is denoted generally at 500. In the example of FIG. 1*a*, the host 500 comprises an ESX host that hosts a backup proxy 502. The backup proxy 502 includes a backup application 504 and a virtual disk application program interface (API) 506 that enables the backup proxy 502 to interact, for example, with a virtual disk attached to the backup proxy 500 by a hot-add process, one example of which is the VMware Hot-Add feature, although that is not required and any other process (es) of comparable functionality could alternatively be employed. Finally, the host 500 includes a VM 508 which may take the form of an Avamar Image Proxy VM, although that is not required and any other VM of comparable functionality could alternatively be employed.

Figure 2:
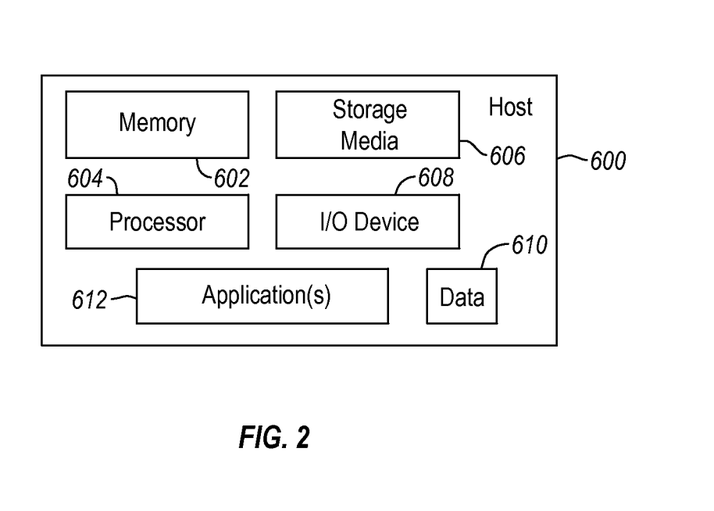
FIG. 2 discloses aspects of an example host.

With reference now to FIG. 2, one example of a host 600, and associated hardware is disclosed. Any of the hosts disclosed herein can include, in addition to any other components they may have, one, some, or all of the components, or any combination thereof, indicated in FIG. 2, although that is not required. Any component, or combination of components, of FIG. 2 may be a virtual component. Thus, a host such as the host 500 for example, can include a combination of physical and virtual components.

As indicated in FIG. 2, the host 600 can comprise any of a variety of host types including, by way of example only, servers (e.g., a file server, an email server, or any other type of server), computers (e.g., desktop computers, laptop computers, tablet devices, smartphones), virtual machines, databases, or any combination thereof. In the example of FIG. 2, the host 600 is a machine, such as a computing device, that includes a memory 602, one or more processors 604, storage media 606, I/O device 608, and data storage 610. As well, one or more applications 612, such as a backup and restore application for example, are provided that comprise executable instructions. One or more nodes of an operating environment, such as the operating environments 100 for example, may be configured similarly, or identically, to the host 600.

B. Definition of Host Affinity Policies

As noted herein, a host affinity policy, which can take the form of a "datastore_group-host_group" combination that defines the structure of a computing environment such as a cluster, can help to ensure that datastores of the cluster are commonly accessible to all of the hosts of the cluster. Consequently, embodiments of a host affinity policy can help to ensure, among other things, that a change to the configuration of the cluster, such as a datastore or host coming offline or otherwise becoming unavailable, does not impair the ability of the backup proxy to continue to back up all of the VMs optimally, or at least in a more optimal manner than would otherwise be the case. Such host affinity policies can be defined and/or used in various operating environments including, but not limited to, the VMware vSphere environment.

A host affinity policy can be defined based on a variety of different criteria including one, some, or all, of the criteria disclosed herein. However, the scope of the invention should not be construed to be limited to any particular criterion, or criteria.

By way of illustration, the host affinity policy can be based at least in part on a need to ensure that de-duplication of data prior to backup is performed preferring to leverage hosts with positive caching or data locality of source virtual disk data. Thus, and with reference to the example of FIG. 1, it may be particularly desirable to perform data de-duplication at the backup proxy 200 since the backup proxy 200 has immediate host storage path access to datastore 400.

As another illustration of a criterion that can form at least part of the basis for a host affinity policy, there may be a need to leverage storage and/or networking data paths where possible. That is, as explained elsewhere herein, use of networking data paths for storage related operations can consume significant network bandwidth, thereby impairing the speed of network operations, among other things. Thus, a host affinity policy can be directed towards minimizing the use of network data paths and, correspondingly, maximizing the use of storage data paths, when performing storage operations such as creating and storing backups.

With reference again to the example of FIG. 1, it may be particularly desirable to avoid, to the extent possible, the use of network 102 in performing storage operations, for at least the reasons noted elsewhere herein. One way this could be achieved, for example, is by a structure such as that illustrated in FIG. 1 where the backup proxy 200 can receive VM data from a host 104, and then de-duplicate and back up that data to data store 400, all by way of data paths internal to the cluster. Thus, while some or all of the elements of such data paths may be connected to the network 102, those network connections are not used or required for data de-duplication and backup. That is, use of a network transport mode is at least partly, or completely, avoided in this example.

Yet another criterion that can form at least part of a basis for defining a host affinity policy concerns the relation between various hosts and datastores in a computing environment. In particular, one or more hosts and datastores can be examined to determine which host(s) in the computing environment have access to which datastore(s) in the computing environment. A host affinity policy may then, for example, be defined that groups hosts together according to which datastore(s) they are able to access. Any hosts that do not access one or more of the indicated datastores are not reflected in the host affinity policy, and any datastores not accessed by one or more of the hosts are not reflected in the host affinity policy.

Still other criteria may be used to drive the definition of host affinity policies and the performance of related processes, such as backups. At least some of these criteria relate to the specific computing environment where the backups take place. Hyper-Convergence, where datastores reside on hosts instead of pooled storage, is an example of this. In the case of Hyper-Convergence technologies with, but not limited to, VM awareness, such as VMware VSAN (virtual storage area network), where datastores reside on servers, it may be desirable for the backup proxy to request blocks from specific hosts. Additionally, or alternatively, the backup proxy may be able to migrate between hosts to achieve this such that the storage data path is optimal, or at least more optimal than would otherwise be the case, and the "hot cache" is always used. As well, in this example, the location of any given VM can be determined easily, such as by using the vSphere API for example, and the VM can be prevented from migrating during backup. In this example, the backup proxy can backup set of VMs at one time that are on a specific host and then migrate to another host to back up the next set of VMs. It should be understood that any group of one or more of the aforementioned functional and structural parameters of a computing environment, such as the VMware VSAN, can be used to drive the definition of a host affinity policy.

Another example of criteria relating to functional and structural parameters of a computing environment concerns what is sometimes referred to as a hyper-converged infrastructure. One characteristic of such a computing environment is that the datastores reside on servers. Such infrastructures can leverage caching (cached blocks) specific to hosts, such as ESX hosts for example, for VMs. In these circumstances, selection of where backup proxies, such as Avamar Image Proxy VMs, run from during backups can be made in such a way as to ensure the ESX Hosts are leveraged to the maximum extent practical in terms of cache locality for the VMs.

Approaches similar to that just described for a hyper-converged infrastructure may be employed in other environments as well. One such environment is an environment, such as the EMC ScaleIO environment for example, where storage for datastores is scaled-out and presented through a data path, such as the ScaleIO data path. This type of environment may also benefit from use of an approach similar to that described above in connection with a VMware VSAN. This type of hyper-convergence may or may not lack VM awareness and thus the optimal data path may require aforementioned optimal storage data path through multiple hosts to back up a single or multiple virtual disks or VMs.

As a further example relating to computing environment topography, information concerning an environment that employs virtual volumes (VVOL) can be used to drive definition of a host affinity policy. In general, such an environment involves the use of datastore access structured as VVOL pool access, and criteria such as those noted herein would apply as well to this type of environment.

As a final example, a host affinity policy can be defined with reference to a physical networking topology. To illustrate, the VMware Virtual Disk Development Kit (VDDK) can be employed by a user to create and access VMware virtual disk storage. Among other things, the VDDK can be used with the vSphere API to write backup and recovery software, or similar applications. Use of VDDK data protection methods with the Avamar Image Proxy VM can also be used in the definition of a host affinity policy based at least in part on the physical networking topology.

For example, in situations where a customer is leveraging converged networking (10GBe) and any one of the following storage protocols with VMware (FCoE, iSCSI, NFS), a backup performed using a Network Block Device Secure Socket Layer (NBDSSL) transport mode may produce better results relative to a backup process that employs hot-add functionality. This may occur since the data plane of the backup leverages the shared converged networking. On the other hand, when an environment has a dedicated storage network (FC) and a dedicated Ethernet network, it may be product better results, for example, faster and more reliable performance, to leverage both networks during backups. Using hot-add functionality can spread the backup load across networks and leverage the aggregate bandwidth. In addition to these modes, SanTransport can also be chosen when valid snapshots are present to be consumed versus the primary ESX datastores.

As illustrated by the foregoing examples, various criteria may inform the creation of a host affinity policy. Moreover, the scope of the invention should not be construed to be limited to the foregoing examples, nor to combinations of those examples.

Separate from, or as part of, definition of a host affinity policy, consideration can also be given to the backup proxy(ies) that serve various hosts. One way to approach this is by considering that data path(s) employed in connection with operation of those proxies. For example, if a proxy is part of a data path that necessitates a network transport mode for performance of a backup operation involving that proxy, that proxy can be identified as unsuited for inclusion in a particular host affinity policy. As such, that proxy would not be an element of a cluster defined by the host affinity policy. As will be apparent, it may become necessary to add and/or relocate backup proxies such that adequate backup proxies are available to support operations in a cluster defined by the host affinity policy.

Figure 3:
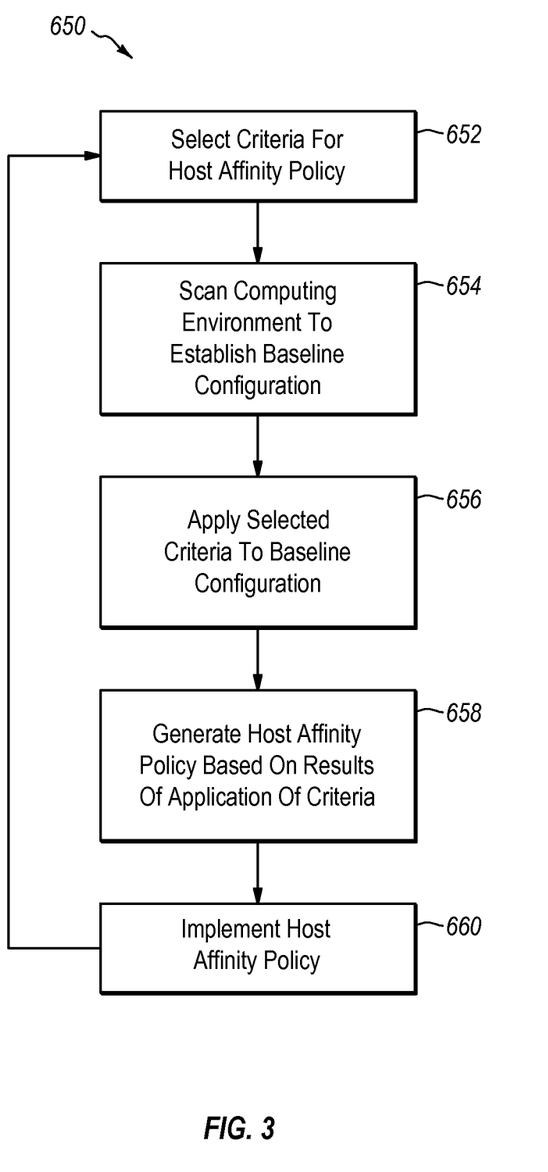
FIG. 3 discloses aspects of a method for generating a host affinity policy.

With the foregoing in mind, attention is directed now to FIG. 3, which discloses a method, one example of which is denoted at 650, for defining a host affinity policy. Some or all of the method can be performed by and/or at the direction of an administrator or other personnel, although that is not required. As well, the method can be performed from a host, such as host 104, although, again, that is not required. The host may, optionally, be part of a cluster that embodies the host affinity policy that is ultimately developed. One, some, or all portions of the method 650 can be performed automatically. In such instances, a portion performed may be performed automatically in response to detection of a network, or other, condition, and/or in response to the failure of an event to occur. Finally, some or all of the method 650 may be performed in, or in connection with, a VMware vSphere environment, although that is not required, and embodiments of the method can be employed in other environments as well.

Initially, one or more criteria, examples of which are disclosed herein, are selected 652 for use in defining a host affinity policy. These selections can be made by an administrator accessing a menu, and/or can be defined on an ad hoc basis by the administrator. A computing environment in which the host affinity policy is desired to be implemented is then scanned 654 so that a baseline configuration of the computing environment can be established. By way of illustration, a scan may reveal that there are 10 hosts, 4 datastores, and 2 backup proxies. In connection with 654, a scan definition, which can be retrievably in stored in a database for re-use, can be created and employed that defines what portion or portions of the computing environment are to be examined and/or by what entity(ies). As well, the baseline information need not be obtained directly from the computing environment itself, but could be obtained from any other source that has information concerning the relevant aspects of the computing environment.

Once the baseline of the computing environment has been established, the selected criteria can then be applied 656 to the baseline information. This application of the criteria will eliminate hosts, datastores and/or proxies that are inconsistent with the applied criteria, leaving a grouping of hosts, datastores and proxies that collectively meet the applied criteria. If desired, an administrator or other personnel can override the resulting grouping and change the contents of that grouping.

After the criteria have been applied to the baseline information, and any further changes implemented to the resulting grouping, a host affinity policy can then be generated 658 based on the application of the criteria. Once generated, the host affinity policy can then be implemented 660. This implementation can result in a group of hosts, datastores and backup proxies, where this group is expressed in the form of a "datastore_group-host_group."

As further indicated in FIG. 3, the method 650 can return to the beginning and various additional and/or different criteria selected 652. More generally, the method 650 can return to 652 at any juncture of the method 650. By way of illustration, such a return could occur where a computing environment scan 654 reveals that an error occurred in the scan, or where it is determined that the computing environment has changed in some way, such as by addition and/or removal of nodes or other elements, since the scan commenced.

Finally, it should be noted that the logic underlying various aspects of the method 650, and related processes, could be performed dynamically for each backup that is performed. Such processes include, but are not limited to, creating VM proxies, configuring VM proxy threads, configuring VM groups, and configuring host affinity groups.

C. Example Cluster Configurations

Figure 4:
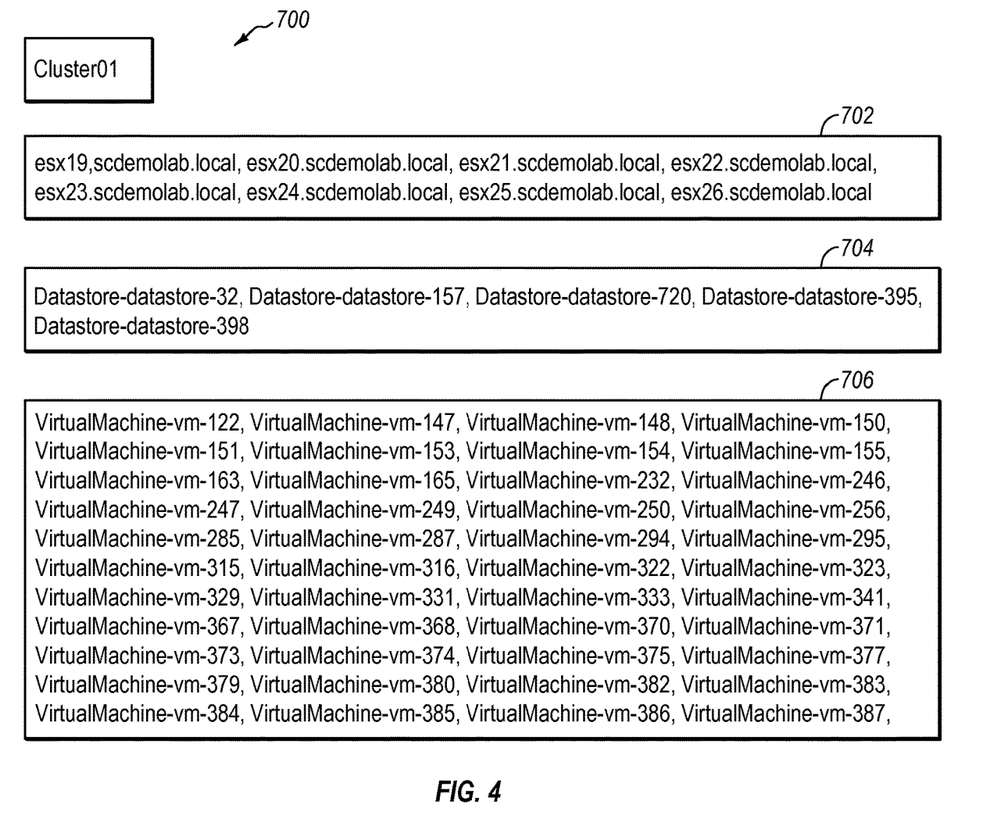
FIG. 4 discloses aspects of a first example host-datastore group.
Figure 5:
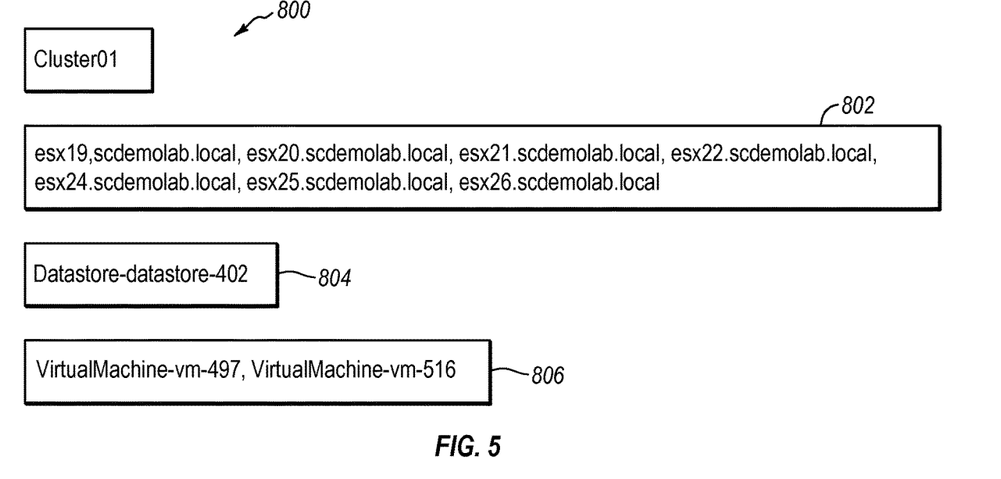
FIG. 5 discloses aspects of a second example host-datastore group.

With attention now to FIGS. 4 and 5, details are provided concerning some example clusters in the form of host-datastore combinations. Details concerning the formation of clusters are disclosed elsewhere herein. While the example clusters of FIGS. 3 and 4 present example clusters as logical constructs, it should be understood that the constituents of the clusters, namely, the hosts, datastores, and VMs of those Figures can be implemented in any of the respective example physical and virtual forms disclosed herein.

Turning first to FIG. 4, a cluster (Cluster01) 700 is disclosed. In general, a cluster, such as cluster 700 for example, can be expressed or referred to as a "datastore_group-host_group" combination. The illustrative cluster 700 includes eight (8) ESX hosts 702. The combination of the ESX hosts 702 and six (6) ESX Datastores 704 collectively reflects an affinity policy by virtue of the fact that the ESX hosts 702 have been identified as having, or have been configured to have, common access to ESX datastores 704. That is, all of the ESX hosts 702 have access to at least the ESX datastores 704, though the ESX hosts 702 could also have access to one or more datastores external to the cluster 700. Thus, logical clusters may overlap in some cases. In other cases, the hosts of a cluster can be configured and implemented such that they have access only to the datastores of the cluster, and no other datastores. These same considerations apply as well to cluster configurations exemplified by cluster 800, discussed below.

Associated with the datastores 704 are a plurality of virtual machines 706 that can be backed up to the datastores 704 using, for example, the VMware Hot-Add feature from a backup proxy, such as the Avamar Image Proxy VM for example. Any other suitable backup application(s) and method(s) can alternatively be employed however.

The example cluster 700 with its ESX hosts 702, datastores 704 and VMs 706 defines a host-datastore_group which can be configured by Avamar, for example, or other applications and methods, to perform optimal, or near-optimal, backups and to perform source-based data de-duplication as close as possible to the source data, such as for example, the host virtual disk 300 in the example of FIG. 1. Other considerations that can play a role in defining the configuration of a cluster include, for example, the total size, number of VMs, and amount of backup data to be scanned and de-duplicated. These considerations can also be used to aid in determining the number of backup proxies, such as Avamar Image Proxies, that will be needed to satisfy backup windows and other needs and parameters of a cluster in connection with which the proxy(ies) will be deployed.

With reference now to FIG. 5, another example a cluster (Cluster01) 800 is disclosed. In general, the cluster 800 is defined using elements of the cluster 700 and can be thought of us as a subset of the cluster 700. Similar to the case of cluster 700, the cluster 800 can be expressed or referred to as a "datastore_group-host_group" combination. In the example of FIG. 4, a subset of ESX hosts 802, that is, seven ESX hosts (out of a total of eight ESX hosts indicated in the cluster 700 of FIG. 3), are able to access a single ESX datastore 804. As well, there are two VMs 806 that can be backed up to the datastore 804.

In this example, since there is a subset of ESX hosts 802 that have access to a datastore 804, a VM-host affinity rule can be created which ensures that the backup proxy, which could be the Avamar Image Proxy VM, for this cluster 800 can only reside on one of the (6) ESX hosts 802 that have direct access to the datastore 804. Thus, the backup proxy in this example only serves the cluster 800. Moreover, if the ESX host 802 that hosts the backup proxy should become unavailable for some reason, the backup proxy can be shifted automatically to another ESX host 802 in the cluster 800. As the foregoing makes clear, definition and implementation of a VM-host affinity rule thus helps to ensure, among other things, predictability and reliability of the backup of the ESX hosts 802 in the cluster 800.

D. Evaluation/Modification of Host Affinity Policies

As noted elsewhere herein, a host affinity policy is not necessarily static in terms of the cluster configuration that it defines. Changes can occur to the computing environment that includes the cluster, and such changes may necessitate one or more revisions to one or more host affinity policies. Such changes include, by way of example, addition, removal and/or relocation of one or more hosts, datastores, and backup proxies, and any other components implicated by a host affinity policy.

Figure 6:
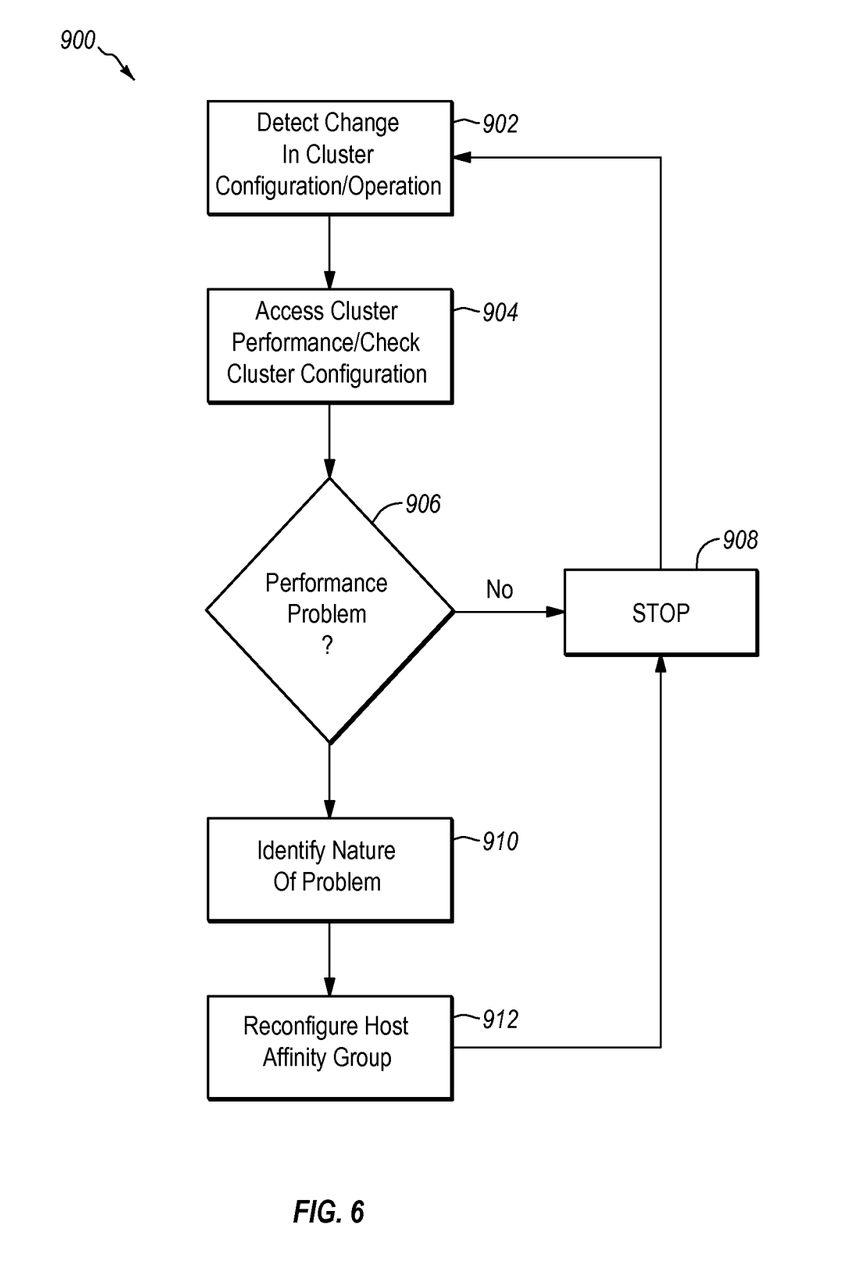
FIG. 6 is a flow diagram disclosing aspects of a method for reconfiguring a host affinity policy in response to a change.

In light of the foregoing, attention is directed now to FIG. 6, which discloses a method, one example of which is denoted at 900, for evaluating and revising, if called for, a host affinity policy. The method 900 can be performed automatically, either in whole or in part, on a host, client or any other node within, or outside, a cluster to which a host affinity policy applies, and some or all of the method 900 may be performed substantially continuously. The method 900 can be directed by an administrator using a suitable graphical user interface (GUI). As well, some or all of the method 900 can be performed at predetermined times or time intervals or, alternatively, on an ad hoc basis, such as in response to the occurrence or non-occurrence of one or more events. It should be noted that the foregoing are presented by example and are not intended to limit the scope of the invention in any way.

Initially, the method beings at 902 where a change is detected in the configuration and/or operation of the cluster. One example of such a change in configuration is a change to a storage path of a cluster defined by a host affinity policy. The change can be detected based on any of a variety of measures including, for example, latency. Such information can be obtained, for example, by using the vSphere API, or comparable element(s), to request information about hosts and the datastores that are attached to each host.

The cluster change is then evaluated 904 to assess the performance of the cluster, which may be expressed, for example, in terms of the operational efficiency and/or operational speed of backup operations in the cluster. Next, a determination is made 906 as to whether or not the performance of the cluster has been compromised as a result of the detected change to the cluster. Compromise may occur, for example, when one or many hosts in the cluster do not have consistent access to the same datastores. Datastores that are attached using local disks can be excluded from these cluster assessments. Configuration information can be obtained, for example, by way of the vSphere API, or comparable element(s), which enables queries to request information about hosts and the datastores that are attached to each host.

As the foregoing suggests, part of 904 may also involve checking the cluster configuration to determine the new configuration that has resulted from the detected change(s). Further details concerning one specific process for determining cluster configuration are discussed below in connection with FIG. 7.

If it is determined at 906 that no problem has resulted from the change to the cluster change, the method 900 advances to 908 and stops, pending detection of another change to the cluster. If, on the other hand, it is determined at 906 that a problem has occurred as a result of the data path change, the method 900 advances to 910 where the specific nature of the problem is identified. Such problems can include, for example, misconfiguration of the cluster such as a situation where one or more hosts in the cluster do not have consistent access to the same datastores. Another example problem is an operational problem with a storage data path of the cluster. Information about detected problems can be obtained, for example, by way of the vSphere API, or comparable element (s), which enables queries to request information about hosts and the datastores that are attached to each host.

Once the nature of the problem(s) has been identified 910, remedial action(s) can be taken 912. In at least some instances, the remedial action includes reconfiguration of the host affinity group to take account of the changes resulting from the identified problems. Identification and implementation of remedial actions can be performed automatically. Subsequent to remediation, the method 900 advances to 908 and stops, pending detection of another change to the cluster.

Figure 7:
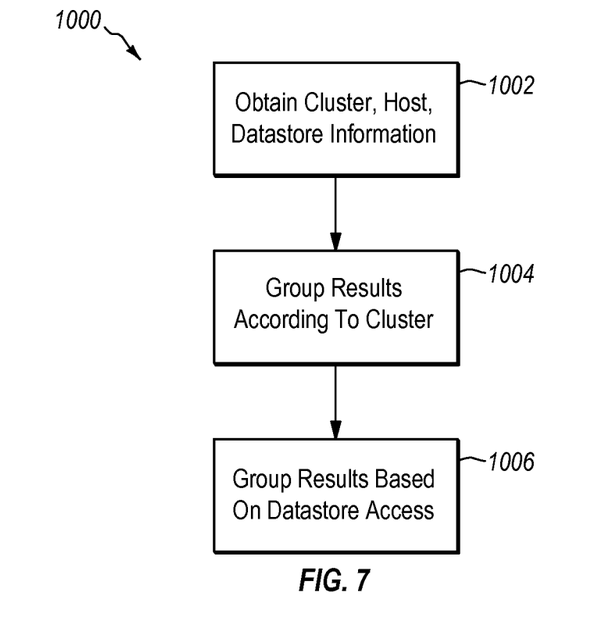
FIG. 7 is a flow diagram disclosing aspects of an example method for determining a cluster configuration.

With continuing attention to FIG. 6, and directing attention now to FIG. 7, details are provided concerning an example method, one example of which is denoted at 1000, for determining a cluster configuration. In general, the method 1000 is concerned with checking the cluster configuration to determine the new configuration that has resulted from the detected change(s).

At 1002, information for clusters, hosts and datastores is obtained from a suitable API or other element(s), such as the vSphere API for example. The host results are then grouped 1004 according to the cluster with which they are associated, although this is not required and the results of the inquiry could be grouped in any other suitable manner. As part of the grouping 1004, the hosts in each cluster are examined and datastores that are not locally attached are excluded from the grouping.

The results can then be grouped 1006 based on hosts that have been identified as having consistent access to identified datastores. These resulting groups thus represent reconfigured host-datastore groups of respective clusters, and each group also represents a backup proxy instance that will be required to be configured to, among other things, allow access to datastores for VM proxy threads, update the VM backup group to leverage the correct proxy thread, and to update a VMware host affinity group setting to ensure the backup proxy only resides on the hosts in the cluster. It should be noted that the backup proxy instance could be deployed automatically, or even added in addition to an existing proxy if it is determined that more backups need to occur concurrently to protect within pre-determined backup windows.

E. Example Backup and Restore Methods

Figure 8:
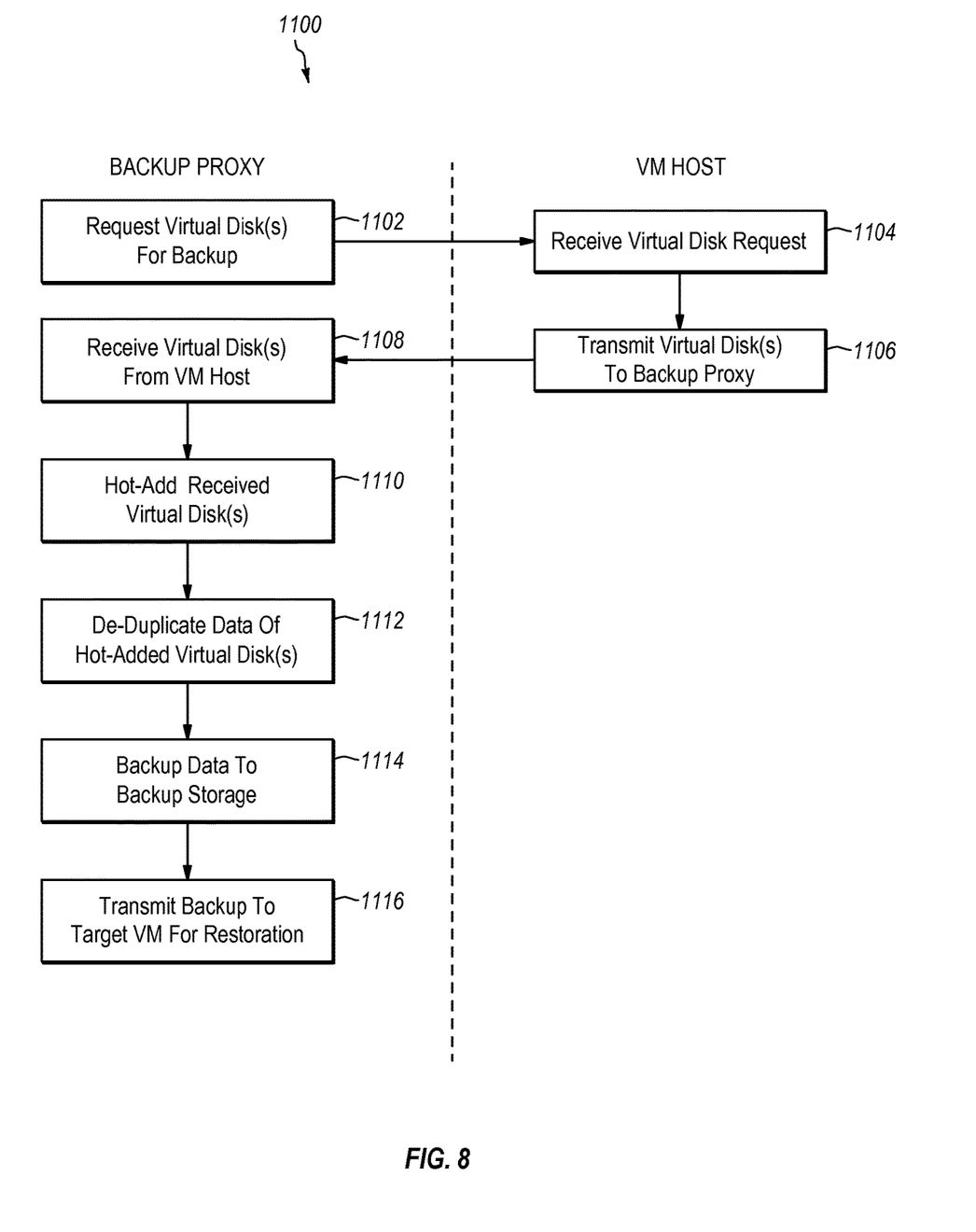
FIG. 8 is a flow diagram disclosing aspects of an example method for backing up a VM.

With attention now to FIG. 8, details are provided concerning a backup and restore method, one example of which is denoted at 1100. Initially, a request is transmitted 1102 from a backup proxy to a VM host in a cluster, identifying the virtual disk(s) of the VM that are needed for a backup operation. The VM host can be an ESX host, although that is not required. As disclosed elsewhere herein, the backup proxy can be, or comprise, a VM that performs operations relating to interfacing with vSphere through VDDK to retrieve the virtual disks from the VM host. In at least some embodiments, the request 1102 is sent, with preference to avoid utilizing a network transport mode and, instead, is requesting access to virtual disks by way of a data path internal to the cluster.

In other cases, the request 1102 for the virtual disks can be conveyed using a network transport mode. For example, network block device (NBD) is the VDDK data plane option that leverages the backup proxy to request, by IP/hostname, the virtual disks to be backed up from the host. In scenarios that are converged, 10Gbe+ for example, or where datastores are accessed via Ethernet (e.g., iSCSI/NFS), NBD may perform similar to a hot-add process, discussed below.

Subsequently, the VM host receives 1104 the request for the virtual disk(s) and transmits 1106 the requested virtual disk(s) to the backup proxy. As in the case of the request 1102, transmission 1106 of the virtual disk(s) to the backup proxy may be by way of a data path internal to the cluster, and without use of a network transport mode. In other cases, transmission 1106 of the virtual disks can occur by way of a network transport mode.

After the backup proxy has received 1108 the virtual disk(s) from the VM host, the virtual disk(s) are locally attached 1110 to the backup proxy, such as by way of a hot-add, or comparable, process. A hot-add process, as used herein, includes but is not limited to, a process in which the hot-add is the VDDK data plane option that leverages the backup proxy to attach virtual disks from another VM to the local operating system. This approach forces the usage of the datastores attached to the respective ESX Host below the backup proxy. If the ESX Host does not have access to the datastore for the virtual disks that are to be backed up however, then a process other than hot-add will be used. One advantage that may be realized by using a hot-add process is that there can be aggregate usage of both storage and Ethernet networks for a higher effective bandwidth.

Both scenarios outlined above, namely NBD and hot-add, can benefit from a host-datastore_group due to source based de-duplication. In both cases, these groups would ensure, prior to source based de-duplication, that traffic across a network is minimized, or at least reduced relative to what would otherwise be the case. These approaches essentially place source based de-duplication as close to the virtual disks and/or their cached blocks as possible.

With continued reference now to FIG. 8, after the virtual disks have been locally added 1110 to the backup proxy, the backup proxy can then perform data de-duplication 1112 on the virtual disk data. The data de-duplication process helps to ensure that only new or changed data is backed up. After de-duplication 1112 is completed, the resulting data set is then backed up 1114 to a cluster datastore.

The backed up data can remain in the cluster datastore until a request to restore one or more target machines, such as a host VM for example, is made. At that point, the backup proxy can retrieve the backup from the cluster datastore and transmit 1116 the backup to the target machine(s).

F. Example Computing Devices and Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware such as solid state disk (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modulates running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or target virtual machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising the following operations:
selecting one or more criterion for a host affinity policy;
scanning a computing environment and establishing a baseline configuration of the computing environment based upon the scan;
applying the selected criteria to baseline configuration information; and
generating a host affinity policy based upon the application of the selected criteria to the baseline configuration information, and the host affinity policy defines a cluster structure that includes a set of hosts, a backup proxy, and a set of datastores that are accessible by all of the hosts through the backup proxy on a first group of one or more storage data paths that connect the hosts to the backup proxy and a second group of one or more storage data paths that connect the backup proxy to the datastores, wherein the hosts are also able to bypass the backup proxy and access the datastores by way of network data paths that connect the cluster elements to each other,
wherein the host affinity policy provides for a hot-add transport mode, and implementation of a hot-add transport process associated with the hot-add transport mode comprises:
transmitting, from the backup proxy to a virtual machine host that includes both a virtual machine and a virtual disk that stores data generated by the virtual machine, a request for a portion of the data stored by the virtual disk;
receiving, at the backup proxy, from the virtual machine host, the requested data stored by the virtual disk of the virtual machine host and using the received data to attach another virtual disk to the backup proxy, and the another virtual disk is attached while the virtual machine at the virtual machine host is running; and
transferring, by way of one of the storage data paths, virtual disk data from the attached another virtual disk to the backup proxy.

2. The method as recited in claim 1, wherein inclusion of the datastores in the host affinity policy is due to their accessibility by the hosts through the storage data paths, and wherein the storage data paths are internal to the cluster.

3. The method as recited in claim 1, wherein inclusion of the backup proxy in the host affinity policy is due to the ability of the backup proxy to reside on any host of the cluster.

4. The method as recited in claim 1, wherein the host affinity policy requires that communication between and among the backup proxy, datastores, and hosts take place along the storage data paths, and wherein the storage data paths are internal to the cluster.

5. The method as recited in claim 1, wherein the one or more criterion comprise a group that includes any one or more of: physical network topology, whether or not the computing environment is a hyper-converged environment, whether or not use of a network transport mode is permissible for data backup processes, which hosts in the computing environment have access to which datastores of the computing environment, and proximity of the backup proxy to the datastores.

6. The method as recited in claim 1, further comprising amending the host affinity policy in response to a change to the computing environment.

7. The method as recited in claim 1, wherein the method is performed recursively and/or automatically.

8. A non-transitory storage medium having stored therein instructions which are executable by one or more hardware processors to perform operations comprising:
selecting one or more criterion for a host affinity policy;
scanning a computing environment and establishing a baseline configuration of the computing environment based upon the scan;
applying the selected criteria to baseline configuration information; and
generating a host affinity policy based upon the application of the selected criteria to the baseline configuration information, and the host affinity policy defines a cluster structure that includes a set of hosts, a backup proxy, and a set of datastores that are accessible by all of the hosts through the backup proxy on a first group of one or more storage data paths that connect the hosts to the backup proxy and a second group of one or more storage data paths that connect the backup proxy to the datastores, wherein the hosts are also able to bypass the backup proxy and access the datastores by way of network data paths that connect the cluster elements to each other,
wherein the host affinity policy provides for a hot-add transport mode, and implementation of a hot-add transport process associated with the hot-add transport mode comprises:
transmitting, from the backup proxy to a virtual machine host that includes both a virtual machine and a virtual disk that stores data generated by the virtual machine, a request for a portion of the data stored by the virtual disk;
receiving, at the backup proxy, from the virtual machine host, the requested data stored by the virtual disk of the virtual machine host the using the received data to attach another virtual disk to the backup proxy, and the another virtual disk is attached while the virtual machine at the virtual machine host is running; and
transferring, by way of one of the storage data paths, virtual disk data from the attached another virtual disk to the backup proxy.

9. The non-transitory storage medium as recited in claim 8, wherein inclusion of the datastores in the host affinity policy is due to their accessibility by the hosts through the storage data paths, and wherein the storage data paths are internal to the cluster.

10. The non-transitory storage medium as recited in claim 8, wherein inclusion of the backup proxy in the host affinity policy is due to the ability of the backup proxy to reside on any host of the cluster.

11. The non-transitory storage medium as recited in claim 8, wherein the host affinity policy requires that communication between and among the backup proxy, datastores, and hosts take place along the storage data paths, and wherein the storage data paths are internal to the cluster.

12. The non-transitory storage medium as recited in claim 8, wherein the one or more criterion comprise a group that includes any one or more of: physical network topology, whether or not the computing environment is a hyper-converged environment, whether or not use of a network transport mode is permissible for data backup processes, which hosts in the computing environment have access to which datastores of the computing environment, and proximity of the backup proxy to the datastores.

13. The non-transitory storage medium as recited in claim 8, wherein definition of a host affinity policy further comprises amending the host affinity policy in response to a change to the computing environment.

14. The non-transitory storage medium as recited in claim 8, wherein definition of host affinity policy is performed recursively and/or automatically.

15. A server, comprising:
one or more hardware processors; and
a non-transitory storage medium having stored therein instructions which are executable by one or more of the hardware processors to perform operations comprising:
selecting one or more criterion for a host affinity policy;
scanning a computing environment and establishing a baseline configuration of the computing environment based upon the scan;
applying the selected criteria to baseline configuration information; and
generating a host affinity policy based upon the application of the selected criteria to the baseline configuration information, and the host affinity policy defines a cluster structure that includes a set of hosts, a backup proxy, and a set of datastores that are accessible by all of the hosts through the backup proxy on a first group of one or more storage data paths that connect the hosts to the backup proxy and a second group of one or more storage data paths that connect the backup proxy to the datastores, wherein the hosts are also able to bypass the backup proxy and access the datastores by way of network data paths that connect the cluster elements to each other,
wherein the host affinity policy provides for a hot-add transport mode, and implementation of a hot-add transport process associated with the hot-add transport mode comprises:
transmitting, from the backup proxy to a virtual machine host that includes both a virtual machine and a virtual disk that stores data generated by the virtual machine, a request for a portion of the data stored by the virtual disk;
receiving, at the backup proxy, from the virtual machine host, the requested data stored by the virtual disk of the virtual machine host and using the received data to attach another virtual disk to the backup proxy, and the another virtual disk is attached while the virtual machine at the virtual machine host is running; and
transferring, by way of one of the storage data paths, virtual disk data from the attached another virtual disk to the backup proxy.

16. The server as recited in claim 15, wherein inclusion of the datastores in the host affinity policy is due to their accessibility by the hosts through the storage data paths, and wherein the storage data paths are internal to the cluster.

17. The server as recited in claim 15, wherein inclusion of the backup proxy in the host affinity policy is due to the ability of the backup proxy to reside on any host of the cluster.

18. The server as recited in claim 15, wherein the host affinity policy requires that communication between and among the backup proxy, datastores, and hosts take place along the storage data paths, and wherein the storage data paths are internal to the cluster.

19. The server as recited in claim 15, wherein the one or more criterion comprise a group that includes any one or more of: physical network topology, whether or not the computing environment is a hyper-converged environment, whether or not use of a network transport mode is permissible for data backup processes, which hosts in the computing environment have access to which datastores of the computing environment, and proximity of the backup proxy to the datastores.

20. The server as recited in claim 15, wherein definition of a host affinity policy further comprises amending the host affinity policy in response to a change to the computing environment.

* * * * *

UNITED STATES PATENT AND TRADEMARK OFFICE
CERTIFICATE OF CORRECTION

| | | |
|---|---|---|
| PATENT NO. | : 10,635,544 B1 | Page 1 of 1 |
| APPLICATION NO. | : 14/209587 | |
| DATED | : April 28, 2020 | |
| INVENTOR(S) | : Clinton S. Kitson | |

It is certified that error appears in the above-identified patent and that said Letters Patent is hereby corrected as shown below:

On the Title Page

Item (57), Abstract, Line 10, change "includes set" to --includes a set--

In the Claims

Column 16
Line 39, after host remove second instance of [the]

Signed and Sealed this
Ninth Day of June, 2020

Andrei Iancu
*Director of the United States Patent and Trademark Office*